United States Patent
Hellenbroich et al.

(10) Patent No.: US 8,661,941 B2
(45) Date of Patent: Mar. 4, 2014

(54) HYBRID DRIVE SYSTEM

(75) Inventors: Gereon Hellenbroich, Aachen (DE); Stefan Kohlhaas, Voerde (DE)

(73) Assignee: FEV Motorentechnik GmbH, Aachen (DE)

( * ) Notice: Subject to any disclaimer, the term of this patent is extended or adjusted under 35 U.S.C. 154(b) by 252 days.

(21) Appl. No.: 13/090,370

(22) Filed: Apr. 20, 2011

(65) Prior Publication Data
US 2011/0259145 A1  Oct. 27, 2011

(30) Foreign Application Priority Data
Apr. 22, 2010 (DE) .......................... 10 2010 028 079

(51) Int. Cl.
*F16H 37/06* (2006.01)
(52) U.S. Cl.
USPC .............................................. 74/661; 74/331
(58) Field of Classification Search
USPC ............................. 74/325, 331, 333, 340, 661
See application file for complete search history.

(56) References Cited

U.S. PATENT DOCUMENTS

| | | | |
|---|---|---|---|
| 7,625,311 B2 * | 12/2009 | Dilzer | 477/5 |
| 2005/0101432 A1 | 5/2005 | Pels et al. | |
| 2010/0311540 A1 * | 12/2010 | Hellenbroich | 477/5 |

FOREIGN PATENT DOCUMENTS

| | | | | |
|---|---|---|---|---|
| DE | 19818108 A1 | 11/1998 | | |
| DE | 19960621 A1 | 6/2001 | | |
| DE | 10049514 A1 | 7/2001 | | |
| DE | 102010022395 A1 * | 12/2010 | ............... | B60K 6/48 |
| WO | WO-2005073005 A1 | 8/2005 | | |
| WO | WO-2008138387 A1 | 11/2008 | | |

* cited by examiner

*Primary Examiner* — Ha D Ho
(74) *Attorney, Agent, or Firm* — Gifford, Krass, Spinkle, Anderson & Citkowski, P.C.

(57) ABSTRACT

A hybrid drive system with first drive 11—especially a combustion engine—and second drive 12—especially an electric machine—for driving a transmission output shaft 20 of a transmission 10 for a vehicle is provided. The transmission 10 can include a first shiftable partial transmission 15 with a first main shaft 17, which is connectable by a first group of shiftable gear pairs 41/51, 45/52, 43/53, 44/54 to an intermediate shaft 28, and the first drive 11 is connectable to the first main shaft 17 of the first shiftable partial transmission 15. In addition, a second shiftable partial transmission 16 with a second main shaft 18, which is connectable by a second group of shiftable gear pairs 45/51, 46/52, 47/53, 48/54 to the intermediate shaft 28, can be included. At least one shiftable gear pair of the first shiftable partial transmission 15 is formed by two shiftable idlers 41, 51, a first of the two shiftable idlers 41 is connectable via a shifting element A to the first main shaft 17 and a second of the two shiftable idlers 51 is connectable via a shifting element C to the intermediate shaft 28.

10 Claims, 4 Drawing Sheets

HYBRID DRIVE SYSTEM

CROSS-REFERENCE TO RELATED APPLICATIONS

This application claims priority of German Patent Application DE 102010028079.8 filed on Apr. 22, 2010.

FIELD OF THE INVENTION

The invention relates to a hybrid drive system with first drive means—especially a combustion engine—and second drive means—especially an electric machine—for driving a transmission output shaft of a transmission for a motor vehicle, wherein the transmission comprises a first shiftable partial transmission with a first main shaft, which is connectable by means of a first group of shiftable gear pairs to an intermediate shaft, wherein the first drive means are connectable to the first main shaft of the first shiftable partial transmission, and a second shiftable partial transmission with a second main shaft, which is connectable by means of a second group of shiftable gear pairs to the intermediate shaft, wherein at least one shiftable gear pair of the first shiftable partial transmission is formed by two shiftable idlers, wherein a first of the two shiftable idlers is connectable to the first main shaft via a shifting element A and wherein a second of the two shiftable idlers is connectable to the intermediate shaft via a shifting element C.

Also, two electric machines can be provided as first and second drive means or besides a combustion engine as first drive means, a flywheel mass system can be provided as second drive means.

BACKGROUND OF THE INVENTION

Vehicles with hybrid drive of various different implementations have in specific drive cycles a more advantageous consumption performance than vehicles, which are solely driven by a combustion engine. Therefore, they are gaining importance in the market.

If an electric machine is used as second drive means, this can be used as a motor and a generator. In the motor function, which necessitates the power supply by a battery, a starting of a combustion engine or a use as a driving motor is possible. When used as a generator it serves for recharging the battery, wherein the power can be drawn from the combustion engine or from the recuperation of kinetic vehicle energy.

If a flywheel mass system is used as second drive means, these can be used for energy storage during deceleration of the vehicle and for the power output during the acceleration of the vehicle. An energy storage can also be achieved by the combustion engine.

In so far as an electric machine and a flywheel mass system are combined to second means, additional operating modes are possible, e.g. the acceleration of the flywheel mass system by the electric machine during standstill of the vehicle and a joint energy output by the flywheel mass system and the electric machine during vehicle acceleration.

From US 2005/0101432 A1 a hybrid drive system of the above named type is known. A hybrid drive system with an automatic mechanical transmission (AMT), which comprises two shiftable partial transmissions and which enables a large number of operating conditions, is known from WO 2008/138387 A1. The arrangement of the drive means on the transmission shafts is, in this case, especially advantageous for the application as a transversal installation in a motor vehicle, thus, especially for the combination with transversally installed combustion engine, which crank shaft is, thus, arranged transversally to the motor vehicle longitudinal direction. Hybrid drive systems are, furthermore, described for example in WO 2005/073005 A1, DE 100 49 514 A1 and DE 198 18 108 A1.

From DE 199 60 621 A1 a hybrid drive for vehicles with a shiftable transmission is known, which comprises a first shiftable partial transmission, which is selectively drivingly connectable to a fuel engine and/or an electric machine, and comprises a second shiftable partial transmission, which is drivingly connected to the electric machine, which can be operated as an electric motor or a generator. The first partial transmission comprises a first countershaft and an output shaft and has six gear steps; the second partial transmission comprises a second countershaft and the same output shaft and has three gear steps.

SUMMARY OF THE INVENTION

The present invention is based on the object, to provide a hybrid drive system, which is characterised by a simple construction in relation to the number of gear steps, which are available. In this case, especially also an optimised construction for the longitudinal installation in motor vehicles should be possible, i.e. especially for the combination with longitudinally installed combustion engines. Furthermore, a compact construction should be achieved, especially a construction, in which the second drive means can be installed in a space saving manner.

The solution is a hybrid drive system of the above named type, wherein at least one of two shiftable idlers is arranged in each power path from the second drive means to each shaft of the transmission, namely the first main shaft, the second main shaft and the intermediate shaft.

Thus, one of the two idlers of the at least one shiftable gear pair is always arranged in the power path or torque flow from the second drive means to each of the shafts, namely to the first main shaft, to the second main shaft and to the intermediate shaft.

Of advantage in this solution is, that further torque transmitting elements, like for example shifting clutches, are not necessary for the coupling of the second drive means to one of the shafts. Only by means of the shifting elements of the at least one shiftable gear pair, which has the two idlers, the second drive means can be selectively drivingly connected to the first main shaft or the intermediate shaft. The second drive means can, in this case, be connected rotationally fixed to one of the idlers, so that the coupling of the second drive means to the first main shaft or the intermediate shaft is achieved via the shifting elements of the idlers.

It is especially advantageous, when the second drive means are arranged in annular construction coaxially to the first main shaft or are arranged coaxially to the intermediate shaft.

Furthermore, it is proposed, that the transmission output shaft is arranged coaxially to the first main shaft or is arranged coaxially to the second main shaft or that the transmission output shaft is represented by the intermediate shaft. This also contributes to a compact form of the drive system.

A combustion engine is used, preferably, as first drive means. The second drive means can, as already named, be need by an electric machine and/or a flywheel mass system with intermediate transmission.

An essential approach is the provision of the used transmission by two partial transmissions, which gear steps are formed partially by gear steps of the common type, in which shiftable gear pairs couple a main shaft directly to an intermediate shaft, and partially by gear steps, in which initially a torque is transmitted from the main shaft via a free-wheeling idler on the intermediate shaft onto the second main shaft, from which then a shiftable gear pair couples this second main shaft directly to the intermediate shaft. The intermediate shaft may form the output shaft or may drive via a gear step a separate output shaft, which is, especially, arranged coaxially to the first main shaft.

By means of a sensible sequence of opening and closing of the friction clutch of the combustion engine as well as a sequence of actuating the shifting elements of the different gears adapted thereto, a shifting, which is free of traction force interruptions, between the gears is possible. Crucial for this type of actuation is, that in the transmission arrangement according to the invention, the to be shifted element (shifting clutch, shifting element) can always be separated, while at least one drive, the combustion engine or the electric machine or the flywheel mass system, is connected in a torque transmitting manner to the drive shaft. During the shifting, the rotational speeds at the to be shifted elements can be matched by means of a corresponding control of the combustion engine and of the electric machine. The friction clutch of the combustion engine allows a sliding switching-on of the combustion engine, as it is common.

In this case, it is provided, that during the operation with both drive means it is shifted without interruption of the traction force, such that a gear change between the gear steps for the two drive means is achieved at different drive speeds, if necessary alternatingly.

Because of the selected arrangement of the combustion engine and of the electric machine, a torque summation is achieved during the operation of both drive machines. Furthermore, a starting with the electric machine as well as a generator operation of the electric machine is possible in the recuperation mode.

Further advantageous embodiments can be found in the dependent claims, to which teaching, thus, it is referred.

Following essential features and advantages of the subject of the invention are named summarisingly again in the following:
- gear change without traction force interruption, i.e. at least one of the drive machines can transmit during the actuation of one or more shifting elements still torque onto the output shaft, however, this function is not given, depending on the selection of the transmission ratio, in all possible shift sequences;
- a pure electric driving is possible;
- starting of the combustion engine is possible by the electric machine;
- starting of the combustion engine is possible during the pure electric driving with the electric machine, also across different gears;
- active synchronisation of the shifting procedures is possible;
- boost operation, i.e. temporary activation of the electric machine is possible;
- recuperation, i.e. recovery of energy by means of the electric machine during the deceleration of the vehicle is possible;
- air-conditioning compressor operation during the standstill of the vehicle is possible;
- maintaining of the AMT-function (automated manual transmission) during the failure of the electric machine (fail safe);
- good efficiency is possible by means of the consumption optimised shifting strategy by utilization of the good efficiency of a conventional shiftable transmission (transmission with toothed wheels) and, thus, a saving of fuel is possible;
- depending on the selection of shifting elements and of the friction clutch, no transmission hydraulic is necessary.

For the provision of a non-hybrid transmission variant, the electric machine can be greatly reduced in size. It can, then, be still used as a starter, i.e. for the start-stop-operation, as an alternator and for the active synchronisation of the transmission. In this case, to a limited extent a boost operation, i.e. an electric additional drive, and a recuperation operation, i.e. electric energy recovery, can be considered.

Compared to known transmissions, additional gears are generated in some of the shifting conditions by the connection in series of several shiftable gear pairs. In this case, with the same number of gear steps, a lower mechanical complexity (number of shafts, number of shifting elements, number of gears) can be ensured, especially in a transmission for a motor vehicle with longitudinal motor installation.

A separate clutch unit for the interconnection of the main shafts can be completely omitted. The shiftable gear pairs are used for the interconnection of the main shafts.

BRIEF DESCRIPTION OF THE DRAWINGS

Preferred embodiments of the invention are shown in the drawings and are described in the following. It shows.

DETAILED DESCRIPTION OF THE PREFERRED EMBODIMENTS

Figure 1:
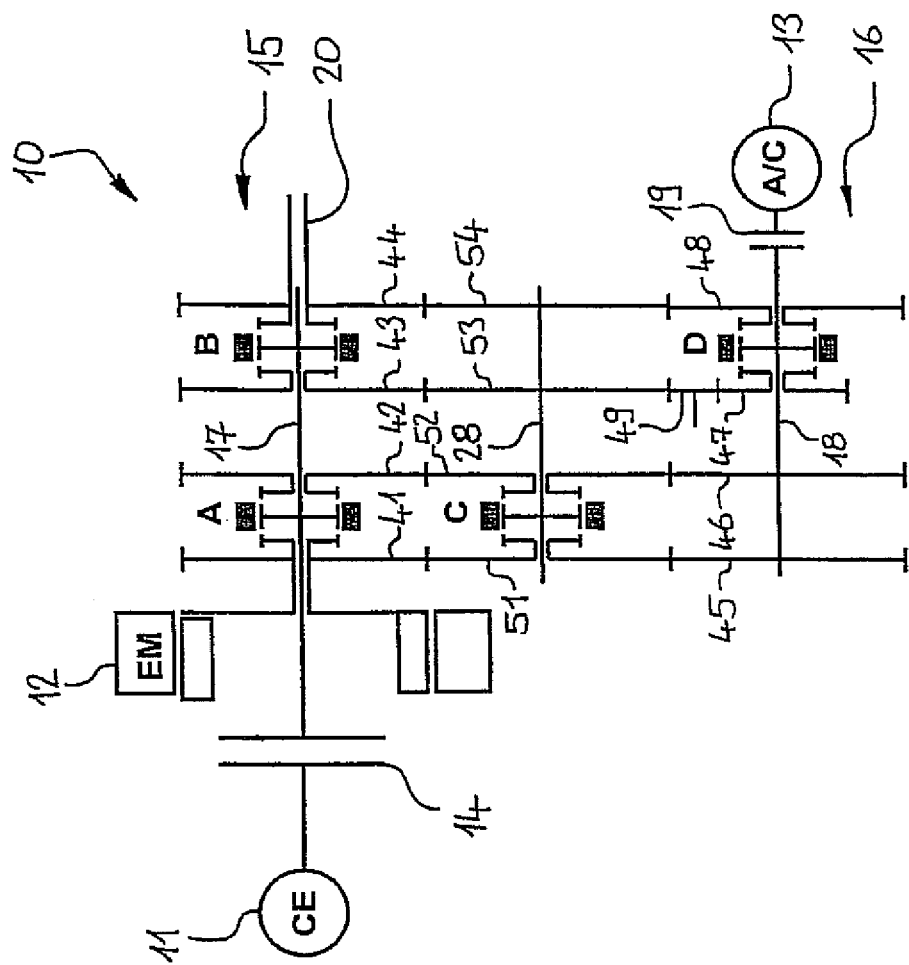
FIG. 1—diagram of a first embodiment of a hybrid drive system according to the invention with second drive means (electric machine) and a transmission output shaft, which are arranged both coaxially to the first main shaft, FIG. 2—a diagram of a second embodiment of a hybrid drive system according to the invention with second drive means (electric machine), which are coaxially arranged to the first main shaft, wherein the transmission output shaft is represented by the intermediate shaft, FIG. 3—a diagram of a third embodiment of a hybrid drive system according to the invention with second drive means (electric machine), which are coaxially arranged to the first main shaft, wherein the transmission output shaft is coaxially arranged to the second main shaft, and FIG. 4—a diagram of a fourth embodiment of a hybrid drive system according to the invention with second drive means (electric machine) and a transmission output shaft, which are both arranged coaxially to the intermediate shaft.

In the Figures, a hybrid drive system according to the invention is shown schematically. Especially the gears are shown identical in size. In reality, the gears have different numbers of teeth and, thus, different diameters. Generally, also different gear types can be used. Especially, it can be considered, that partially gears with double toothing can be used, i.e. gears with two annular gears, which have different numbers of teeth. In FIG. 1 a hybrid drive system is shown, which comprises first drive means, here in form of a combustion engine (CE) 11, second drive means, here in form of an electric machine (EM) 12, and an auxiliary drive machine 13, here in form of a compressor for an air-conditioning (A/C). The combustion engine is coupleable via a friction clutch 14 as a starting element, which can be formed as a wet or dry clutch, to the transmission 10. The transmission 10 comprises two shiftable partial transmissions 15, 16 (stepped variable speed transmission), which is characterised such, that it has a first main shaft 17 and a second main shaft 18, respectively, connected to a common intermediate shaft 28. The main shaft 17 of the first shiftable partial transmission 15 is connectable via the friction clutch 14 to the combustion engine 11, while the main shaft 18 of the second shiftable partial transmission 16 is connectable via a shifting clutch 19 to the auxiliary output machine 13. The first main shaft 17 is coupled via four gear pairs 41/51, 42/52, 43/53, 44/54 to the intermediate shaft 28. The second main shaft 18 is coupled via four gear pairs 45/51, 46/52, 47/53, 48/54 also to the intermediate shaft 28. The intermediate shaft 28 can be connected via the gear step 44/54 to a transmission output shaft 20, which is coaxially arranged to the first main shaft 17. In the shiftable partial transmission 15, the gears 41, 42, 43, 44 on the first main shaft 17, which interact with the gears 51, 52, 53, 54 on the intermediate shaft 28, are all shift wheels (idlers), wherein the gears 41, 42 share a first shifting element A and the gears 43, 44 share a second shifting element B. Furthermore, also the gears 51, 52 on the intermediate shaft 28 are shift wheels (idlers) according to the invention, which are actuated by a third shifting element C.

In the second shiftable partial transmission 16, the gears 45, 46 are fixed gear, which form with the gears 51, 52 on the intermediate shaft 28 gear pairs, wherein the latter are shift wheels (idlers), which are shifted together by the shifting element C. In contrast, the gears 47, 48 on the second main shaft 18, which form together with the gears 53, 54 on the intermediate shaft 28, which are formed as fixed gears, gear pairs, are shift wheels (idlers), which are shifted by means of a fourth shifting element D. The gear 47 acts via an intermediate gear 49 on the gear 53, so that this gear group is suitable to provide a reverse gear R.

On the one hand by means of the arrangement of the gear pairs, in which, respectively, both gears are shift wheels, a conventional gear change is possible by inclusion of the shiftable partial transmission 15 and of the shiftable partial transmission 16 for the vehicle drive, and on the other hand, thus, the possibility of the connection in series of the gear ratio steps of both shiftable partial transmissions 15, 16 is achieved, so that the effective number of gear steps of the transmission 10 is increased.

The electric machine 12 is connectable via the shiftable idler 41 to the first main shaft 17 or the intermediate shaft 28 of the transmission 10. The electric machine 12 can be connected via the idler 41 to the first main shaft 17. For this, the idler 41 is connected by means of the first shifting element A to the first main shaft 17. The electric machine 12 can be connected via the idlers 41, 51 to the intermediate shaft 28. For this, the idler 51 is connected by means of the third shifting element C to the intermediate shaft 28. By means of the idlers 41, 51 and of the fixed gear 45, the electric machine 12 is connected to the second main shaft 18.

A compact construction is, especially, achieved such, that the electric machine 12 is arranged coaxially to the first main shaft 17 and around the same. Therefore, the electric machine 12 is formed annular and is arranged around the first main shaft 17. The electric machine 12 can be space savingly arranged in this case within a bell housing.

Furthermore, the transmission output shaft 20 is arranged coaxially to the first main shaft 17 and thus, is also arranged coaxially to a drive shaft of the combustion engine 11.

Figure 2:
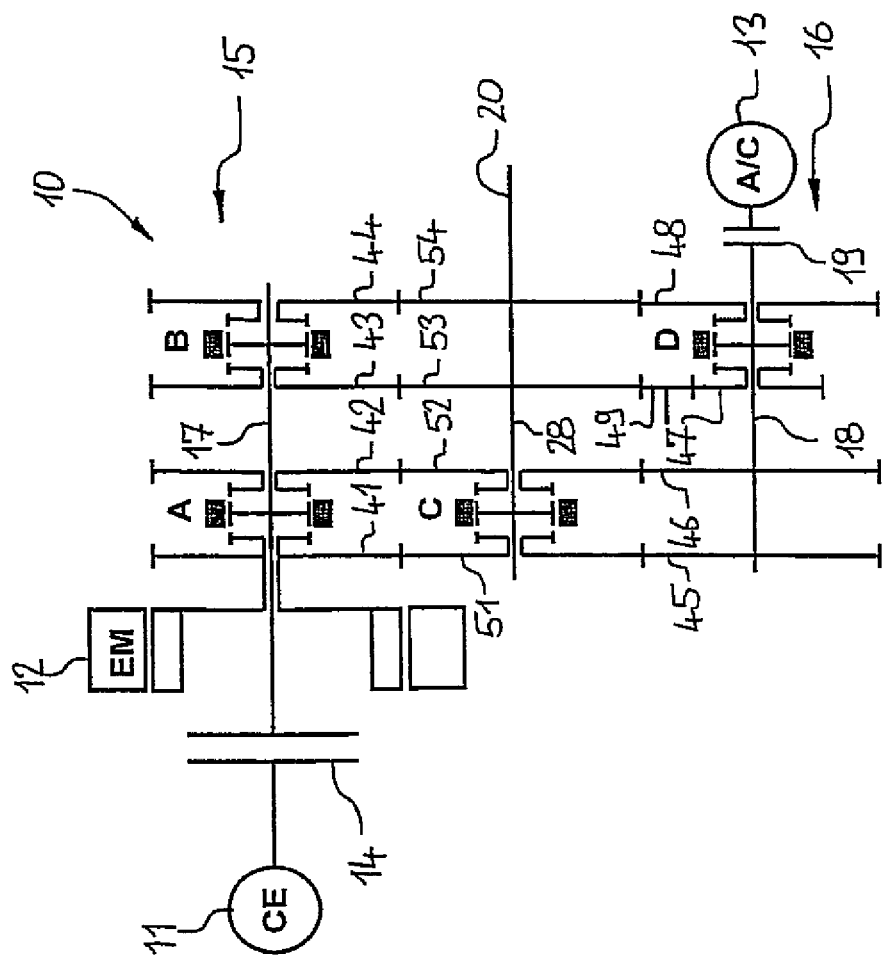

FIG. 2 shows a second embodiment of a hybrid drive system according to the invention, which corresponds generally to the first embodiment of FIG. 1, wherein corresponding components are provided with the same reference numerals and are described in connection with FIG. 1.

The second embodiment differs from the first embodiment such, that the output shaft 20 is represented by the intermediate shaft 28.

Figure 3:
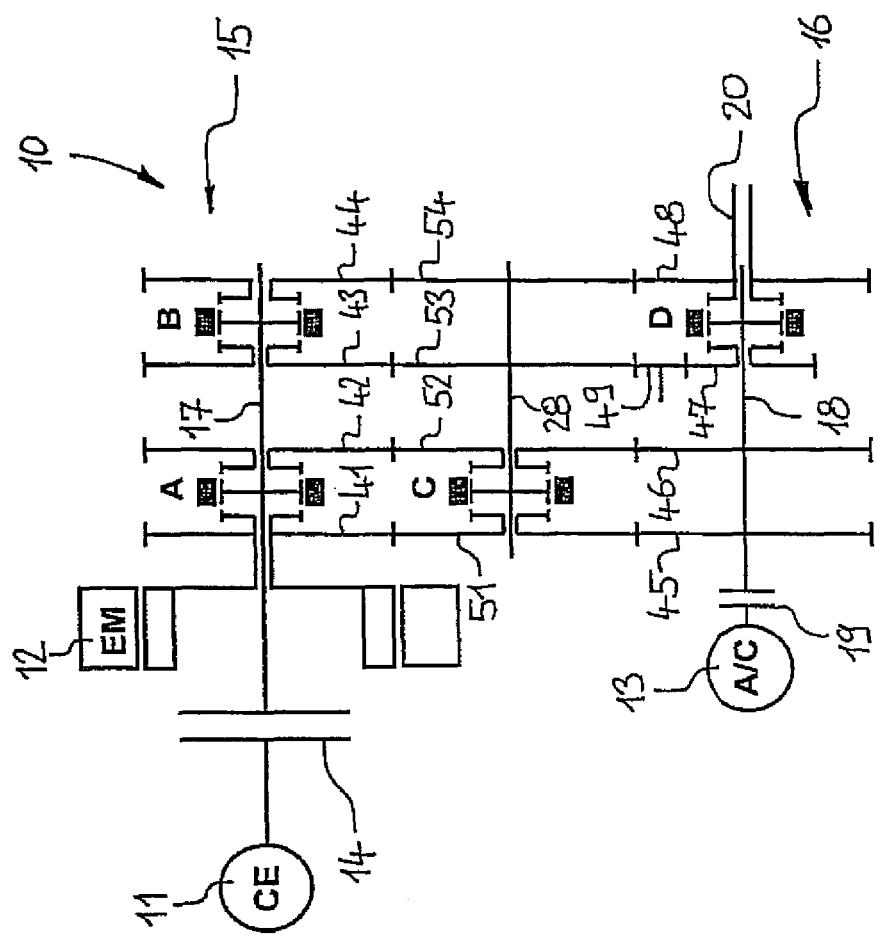

FIG. 3 shows a third embodiment of a hybrid drive system according to the invention, which corresponds generally to the first embodiment of FIG. 1, wherein corresponding components are provided with the same reference numerals and are described in connection with FIG. 1.

The third embodiment differs from the first embodiment such, that the output shaft 20 is arranged coaxially to the second main shaft 18.

Figure 4:
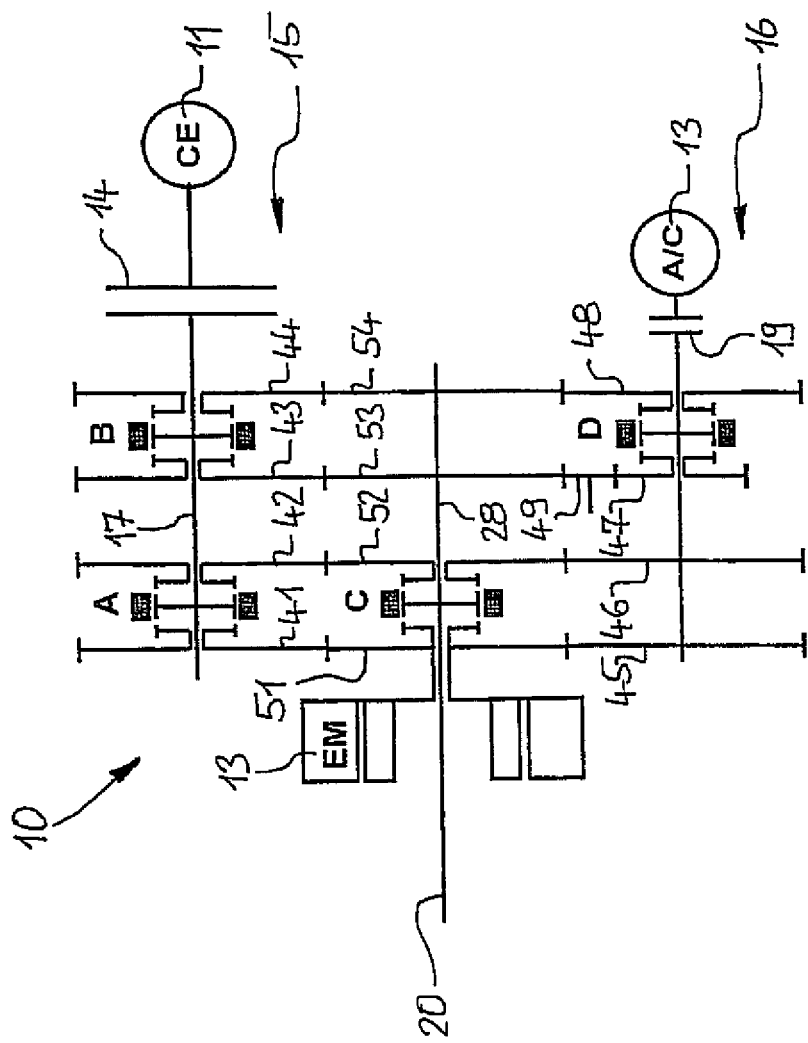

FIG. 4 shows a fourth embodiment of a hybrid drive system, which corresponds generally to the second embodiment of FIG. 2, wherein corresponding components are provided with the same reference numerals and are described in connection with FIGS. 1 and 2.

The fourth embodiment has also an intermediate shaft 28, which forms the output shaft 20. But, the electric machine 11 is arranged coaxially to the intermediate shaft 28/output shaft 20.

The invention claimed is:

1. A hybrid drive system with a first drive means and second drive means for driving a transmission output shaft of a transmission for a motor vehicle, the hybrid drive system comprising:
    a first shiftable partial transmission with a first main shaft, which is connectable to an intermediate shaft by means of a first group of shiftable gear pairs, the first drive means connectable to the first main shaft of the first shiftable partial transmission; and
    a second shiftable partial transmission with a second main shaft, which is connectable to the intermediate shaft, by means of a second group of shiftable gear pairs;
    wherein at least one shiftable gear pair of the first shiftable partial transmission is formed by two shiftable idlers, a first of the two shiftable idlers is connectable to the first main shaft via a first shifting element, and a second of the two shiftable idlers is connectable to the intermediate shaft via a second shifting element; and
    at least one of the two shiftable idlers is arranged in each possible power path from the second drive means to the first main shaft, the second main shaft and the intermediate shaft.

2. The hybrid drive system according to claim 1, wherein the second drive means is arranged in annular construction coaxially to the first main shaft or coaxially to the intermediate shaft.

3. The hybrid drive system according to claim 1, wherein the transmission output shaft is arranged coaxially to the first main shaft or is arranged coaxially to the second main shaft.

4. The hybrid drive system according to claim 1, wherein the transmission output shaft is the intermediate shaft.

5. The hybrid drive system according to claim 1, wherein an auxiliary output machine is connectable to one of the main shafts.

6. The hybrid drive system according to claim 1, wherein at least two shiftable gear pairs are formed, respectively, by two shiftable idlers, which are connectable to their shafts via the first and second shifting elements.

7. The hybrid drive system according to claim 6, wherein the two shiftable gear pairs, made up exclusively of shiftable idlers in the first shiftable partial transmission, are arranged on the first main shaft and on the intermediate shaft.

8. The hybrid drive system according to claim 6, wherein only shiftable idlers are provided on the first main shaft.

9. The hybrid drive system according to claim 6, wherein the second shiftable transmission has only shiftable gear pairs made up from one fixed gear, connected to its shaft, and an idler, shiftable with its shaft.

10. The hybrid drive system according to claim 9, wherein the second shiftable partial transmission has two shiftable idlers arranged on the second main shaft and two shiftable idlers arranged on the intermediate shaft.

* * * * *